United States Patent
Gerrie

(10) Patent No.: US 12,413,564 B2
(45) Date of Patent: Sep. 9, 2025

(54) SECURE MEDIA DELIVERY

(71) Applicant: Sky CP Limited, Isleworth (GB)

(72) Inventor: Andrew Gerrie, Isleworth (GB)

(73) Assignee: Sky CP Limited, Isleworth (GB)

( * ) Notice: Subject to any disclaimer, the term of this patent is extended or adjusted under 35 U.S.C. 154(b) by 388 days.

(21) Appl. No.: 17/631,866

(22) PCT Filed: Jul. 30, 2020

(86) PCT No.: PCT/GB2020/051833
§ 371 (c)(1),
(2) Date: Jan. 31, 2022

(87) PCT Pub. No.: WO2021/019248
PCT Pub. Date: Feb. 4, 2021

(65) Prior Publication Data
US 2022/0286440 A1 Sep. 8, 2022

(30) Foreign Application Priority Data
Aug. 1, 2019 (GB) .................................... 1911005

(51) Int. Cl.
*H04L 9/40* (2022.01)
*G06F 21/10* (2013.01)
*H04L 9/32* (2006.01)

(52) U.S. Cl.
CPC .......... *H04L 63/0442* (2013.01); *G06F 21/10* (2013.01); *H04L 9/3242* (2013.01)

(58) Field of Classification Search
CPC .... H04L 63/0442; H04L 9/3245; G06F 21/10
See application file for complete search history.

(56) References Cited

U.S. PATENT DOCUMENTS 8,612,298 B1 * 12/2013 Talreja .................. G06Q 30/00
705/26.1
9,152,411 B2 10/2015 Livshits et al.
(Continued)

FOREIGN PATENT DOCUMENTS

GB 2612217 B 4/2024
WO 2010/146140 A1 12/2010
(Continued)

OTHER PUBLICATIONS

International Search Report and Written Opinion of the International Searching Authority mailed on Oct. 16, 2020, In connection with International App. No. PCT/GB2020/051833 (12 pages).
(Continued)

*Primary Examiner* — Hee K Song
(74) *Attorney, Agent, or Firm* — McCarter & English, LLP

(57) ABSTRACT

Systems and methods for secure content delivery are described, whereby a software application is provided to a plurality of client devices, the software application configured to implement an application code library. A respective application code library is provided to each one of the plurality of client devices, wherein each application code library implements a respective cryptography key. A CDN cryptographically verifies that a received request was generated using the respective application code library of the requesting client device, before delivering content to the software application on the requesting client device. Other embodiments are also described and claimed.

12 Claims, 8 Drawing Sheets

(56) References Cited

U.S. PATENT DOCUMENTS

| | | | |
|---|---|---|---|
| 9,317,677 B1* | 4/2016 | Scott | G06F 21/128 |
| 10,142,306 B1 | 11/2018 | Shemesh et al. | |
| 2009/0100518 A1* | 4/2009 | Overcash | G06F 21/552 |
| | | | 726/22 |
| 2010/0303231 A1 | 12/2010 | Gorissen et al. | |
| 2011/0067012 A1 | 3/2011 | Eisen et al. | |
| 2012/0093313 A1 | 4/2012 | Michiels | |
| 2012/0124372 A1 | 5/2012 | Dilley et al. | |
| 2012/0331292 A1 | 12/2012 | Haggerty et al. | |
| 2014/0215018 A1* | 7/2014 | Lam | H04L 65/61 |
| | | | 709/219 |
| 2015/0121073 A1 | 4/2015 | Wajs | |
| 2015/0172228 A1* | 6/2015 | Zalepa | H04L 12/1813 |
| | | | 709/206 |
| 2017/0054561 A1* | 2/2017 | Schleiff | H04L 9/3231 |
| 2017/0187521 A1* | 6/2017 | Fitch | H04L 67/02 |
| 2017/0316214 A1 | 11/2017 | El Defrawy et al. | |
| 2017/0373840 A9 | 12/2017 | Fitch et al. | |
| 2018/0293365 A1 | 10/2018 | Freitas Fortuna dos Santos et al. | |
| 2018/0373849 A1 | 12/2018 | Gidley et al. | |
| 2019/0268315 A1* | 8/2019 | Miller | H04L 9/0891 |

FOREIGN PATENT DOCUMENTS

| | | |
|---|---|---|
| WO | 2017/096475 A1 | 6/2017 |
| WO | 2018/112076 A1 | 6/2018 |

OTHER PUBLICATIONS

Combined Search and Examination Report dated Jan. 23, 2020, issued in connection with UK Patent App. No. 1911005.5 (5 pages).

Examination Report dated Sep. 2, 2020, issued in connection with UK Patent App. No. 1911005.5 (3 pages).

M. Joye, "On White-Box Cryptography," In: A. Elçi et al. (eds.), Security of Information and Networks, 2008, pp. 7-12 (6 pages).

A. Lingnau et al., "Supporting Mobility through Computer Networks," In: K. Geihs et al. (eds.), Networks: Standardization, Infrastructure, and Applications, 2002, pp. 65-98 (36 pages)—see p. 86.

F. Hohl, "Time Limited Blackbox Security: Protecting Mobile Agents From Malicious Hosts," In: Vigna G. (eds) Mobile Agents and Security, Lecture Notes in Computer Science, vol. 1419, 1998 (22 pages).

Hosseinzadeh et al., "Diversification and Obfuscation Techniques for Software Security: A Systematic Literature Review", Information and Software Technology, vol. 104, 2018, pp. 72-93 (22 pages).

Examination Report dated Feb. 16, 2023, issued in connection with UK Patent App. No. 2300086.2 (6 pages).

Examination Report dated Dec. 15, 2023, issued in connection with UK Patent App. No. 2300086.2 (5 pages).

Intention to Grant dated Jan. 19, 2024, issued in connection with UK Patent App. No. 2300086.2 (2 pages).

Office Action dated Jun. 10, 2025, issued in connection with U.S. Appl. No. 19/191,252 (12 pages).

\* cited by examiner

__SECURE MEDIA DELIVERY__

RELATED APPLICATIONS

The present application is a U.S. National Phase Application under 35 U.S.C. § 371 of International Application No. PCT/GB2020/051833 filed on Jul. 30, 2020, which claims the benefit of United Kingdom (Great Britain) Patent Application No. 1911005.5 filed on Aug. 1, 2019, the entire disclosures of which are expressly incorporated by reference herein.

FIELD OF THE INVENTION

This invention relates generally to a media delivery system, and more particularly to secure delivery of software applications and media content to devices.

BACKGROUND

Media delivery systems are generally known, in which content delivery networks (CDNs) are used to provide a content delivery service on behalf of content providers. CDNs are typically a geographically distributed network of proxy servers to provide high availability and high performance in the delivery of content, including web objects (text, graphics, scripts, etc.), downloadable objects (media files, software applications, etc.), live and on-demand streaming media, and the like.

There is an on-going need for improved security and authentication controls in such systems, to protect against the wide array of varied malicious and fraudulent attacks. The present invention aims to address these and other related issues.

SUMMARY OF THE INVENTION

Aspects of the present invention are set out in the accompanying claims.

According to one aspect, the present invention provides a method of secure content delivery, comprising providing a software application to a plurality of client devices, the software application configured to implement an application code library; providing a respective application code library to each one of the plurality of client devices, wherein each application code library implements a different cryptography key; receiving a request at a content distribution network, CDN, from a requesting one of the client devices; cryptographically verifying that the received request was generated using the respective application code library of the requesting client device; and delivering content to the software application on the requesting client device.

In another aspect, the present invention provides a method performed at a client device in a media delivery system, of: receiving, from a server, a software application, wherein a first portion of the software application is statically obfuscated, and a second portion of the software application is dynamically obfuscated for the client device; generating a request using the second portion of the software application; and transmitting the request to the server.

Embodiments of the present invention thereby advantageously address the problems of enhanced security (by reducing susceptibility to hacks) and greater efficiency (caching time-bounded per user key validity states).

In other aspects, each unique application code library may include computer-executable instructions for digitally signing data using a respective user or device specific, cryptography key. The software application may be configured to use the unique application code library to digitally sign a request for data. The request may be first signed using a first cryptography key, such as a browser key, followed by a second signing using the unique application code library. Each application code library may include obfuscated code that is unique to a respective client device. The software application may include statically obfuscated code.

Advantageously, the system is thereby configured to determine that a request, such as an authentication or media request, is generated and transmitted by a trusted client device, since the request must be signed by a dynamically obfuscated user-specific authentication code library.

In another aspect, digitally signing a request may comprise embedding data identifying a time of the signing. Cryptographically verifying the received request may comprise decrypting the signed request, recovering the time of signing, and verifying that the time of signing is within a defined validity period.

In another aspect, a second request may be received from the requesting client device after providing the software application, wherein the second request is for a unique application code library. The unique application code library may be generated, for example by a CDN server, in response to the received second request. Alternatively, a CDN server may determine and retrieve one of a plurality of stored unique application code libraries, for example from a cache memory. In such an implementation, the plurality of stored unique application code libraries may be received or generated at defined intervals, for example by an obfuscation service node of the CDN. The validity of a particular application code library, as provided to a client device, may be revoked at the CDN level.

The system is thereby further advantageously configured for stateless and thereby efficient control of the user-specific authentication code libraries, for example to handle expired, fraudulent and/or compromised code. Additionally, if a client device and the CDN both use the same domain, both API calls and streaming calls will have the same token tied to them. Moreover, a user could switch between different CDN vendors that are configured to use the same private CDN key to encrypt and decrypt the secure tokens.

In other aspects, an authentication token may be further provided to the requesting client device, wherein the authentication token is included in the received request. The authentication token in a received request may be cryptographically verified based on a secret key, for example known only to the CDN. The authentication token may include data identifying a session ID, whereby the session ID of a received request may be validated against a CDN blacklist or whitelist. An update to the list of blocked or allowed session IDs may be caused in response to detected data tampering on a session ID.

In yet other aspects, there are provided apparatus and systems configured to perform the methods as described above. In a further aspect, there is provided a computer program comprising machine readable instructions arranged to cause a programmable device to carry out any one of the methods as described above.

BRIEF DESCRIPTION OF THE DRAWINGS

There now follows, by way of example only, a detailed description of embodiments of the present invention, with references to the figures identified below.

FIG. 2, which comprises

DESCRIPTION OF EMBODIMENTS

The present disclosure relates to on-demand delivery of software applications and media content to client devices. Components of the software applications may be compiled code files that are designed to be dynamically provided to the client devices and executed by the client devices to request and receive media from a content server. It is necessary to protect particular code components to provide secured delivery of media content over the Internet. For example, obfuscated code files may be created, where parts of the code files are uniquely obfuscated for client devices and/or users, and cacheable at the CDN-level. The uniquely obfuscated code components may be used for user-specific authorisation and/or authentication protocols with content provider systems. The uniquely obfuscated code components may also be configured to implement time bounding, whereby a user is forced to go through a reauthorisation journey after a defined validity period. Techniques described herein thereby provide enhanced caching and performance efficiencies, and high scalability.

Figure 1:
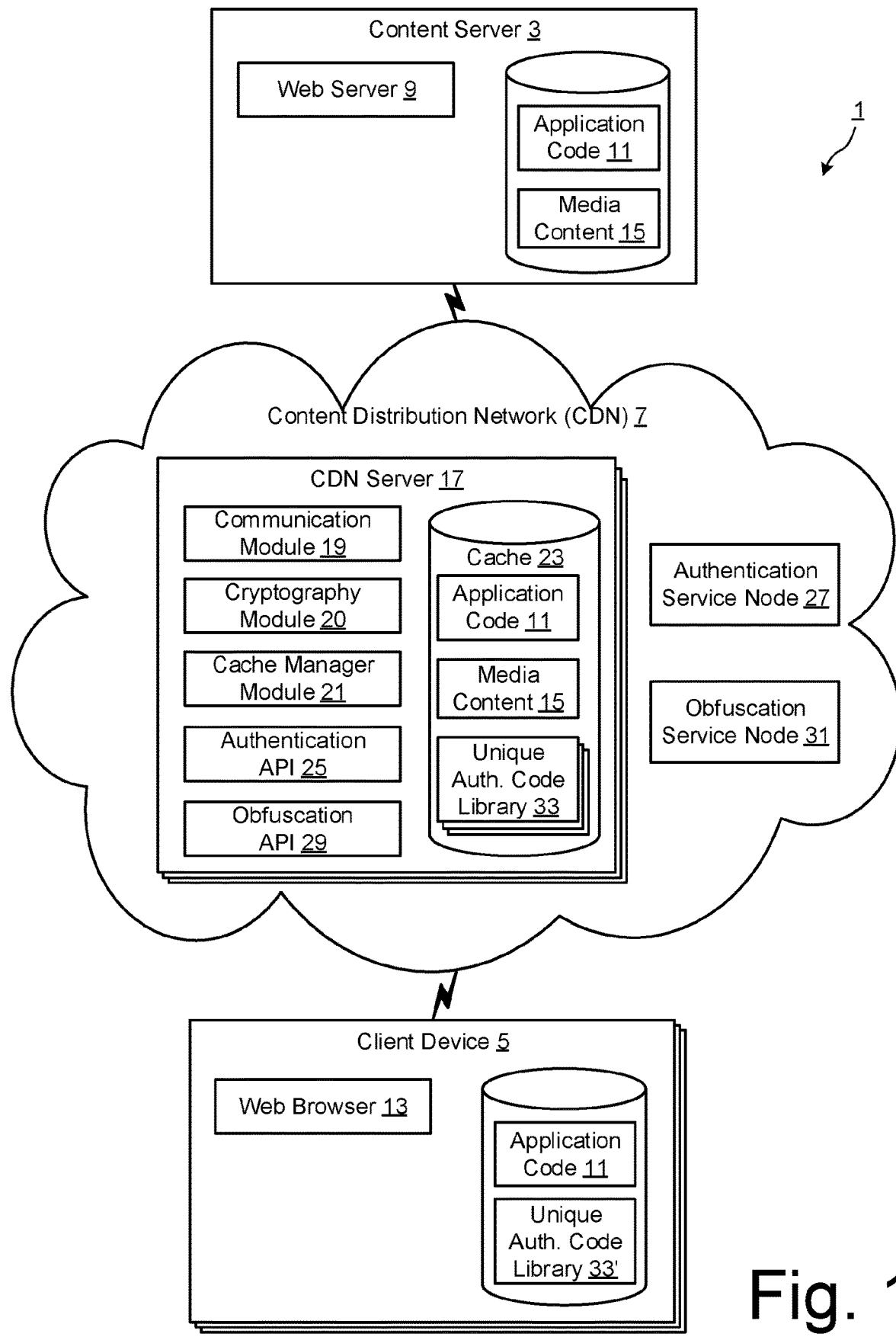
FIG. 1 is a block diagram showing the main components of a media delivery system according to an embodiment of the invention.
Figure 2A:
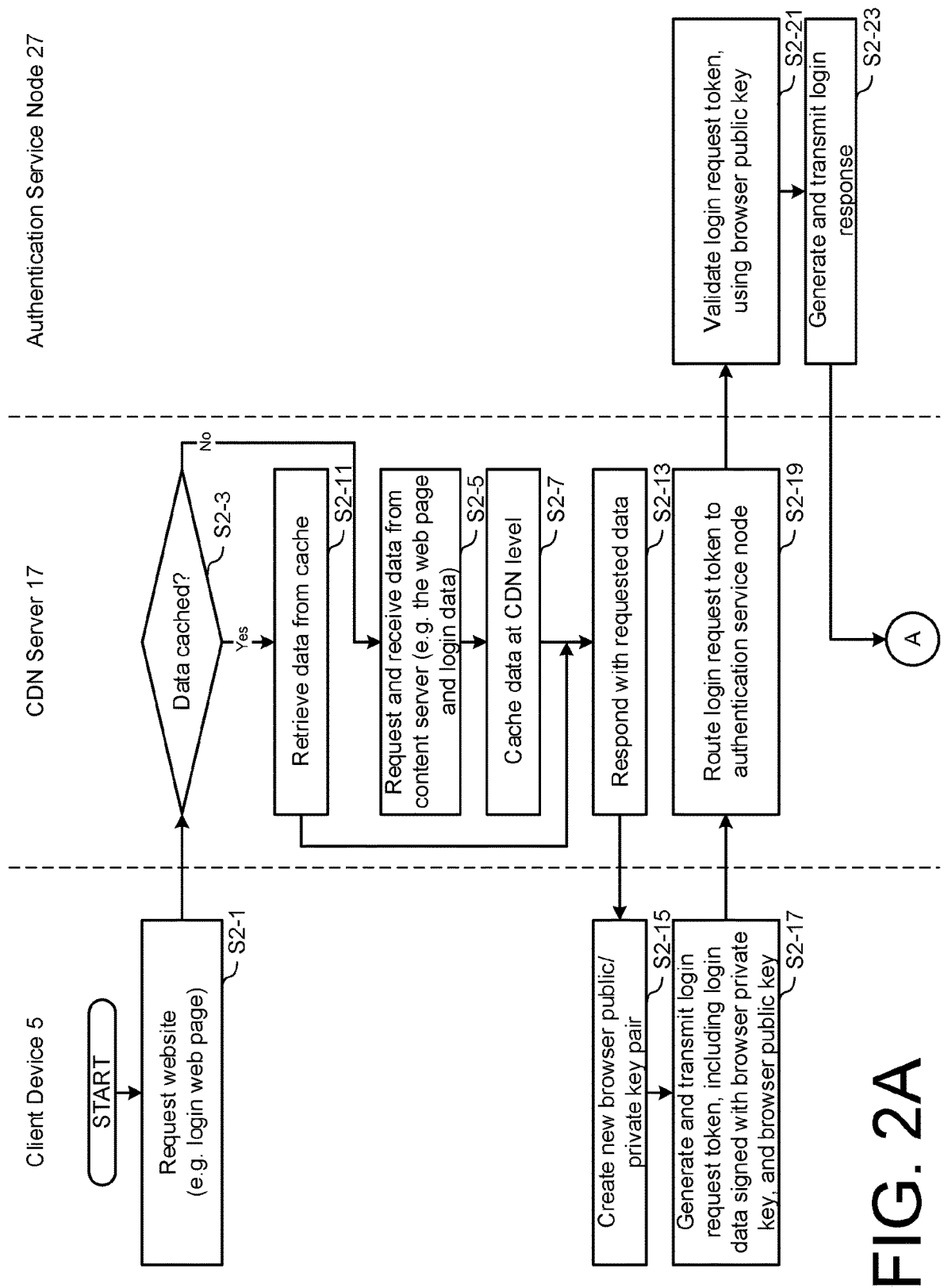
FIGS. 2A to 2F, is a flow diagram illustrating the main processing steps performed by respective components of the system of FIG. 1 according to an embodiment.
Figure 2B:
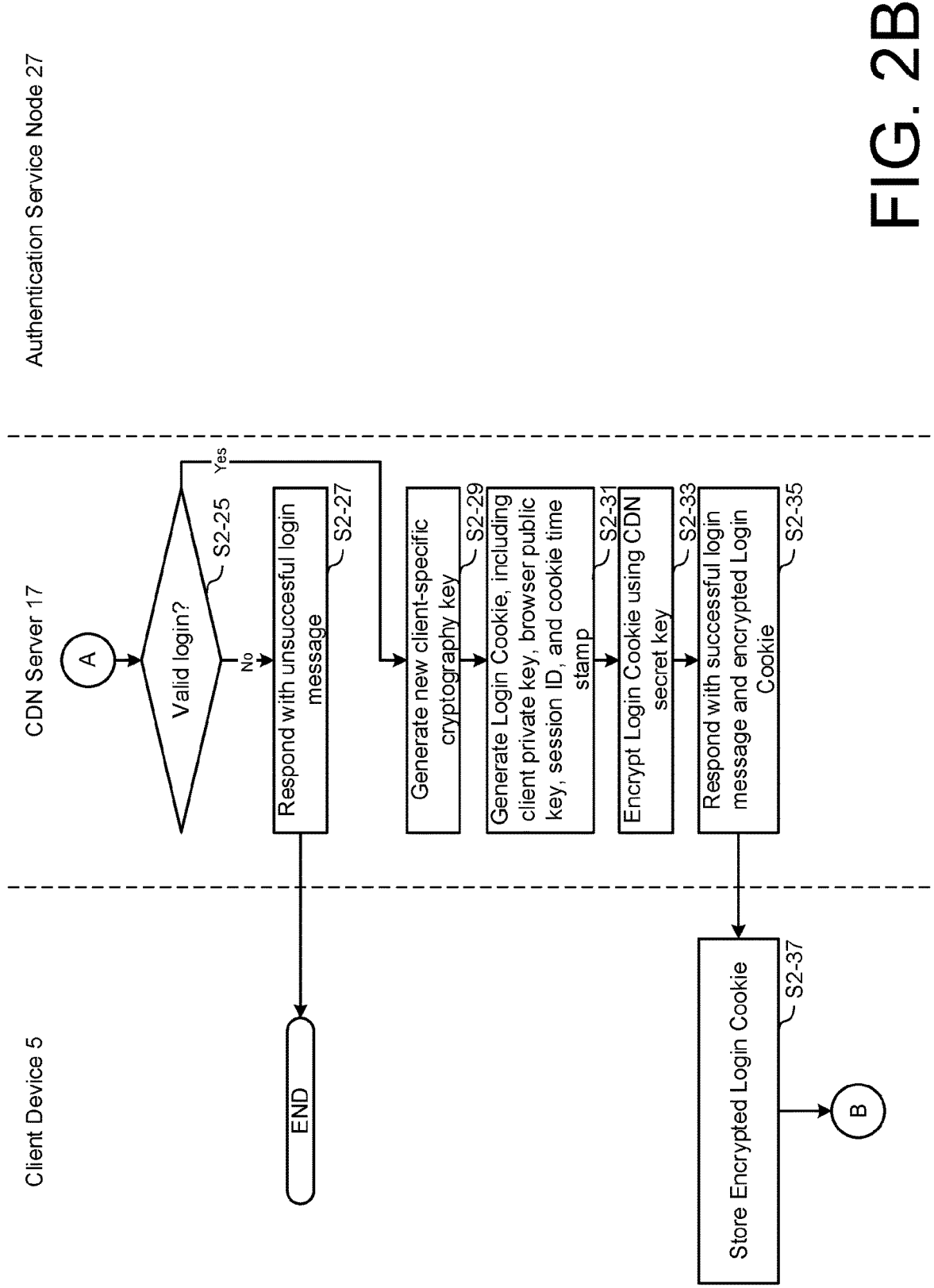
Figure 2C:
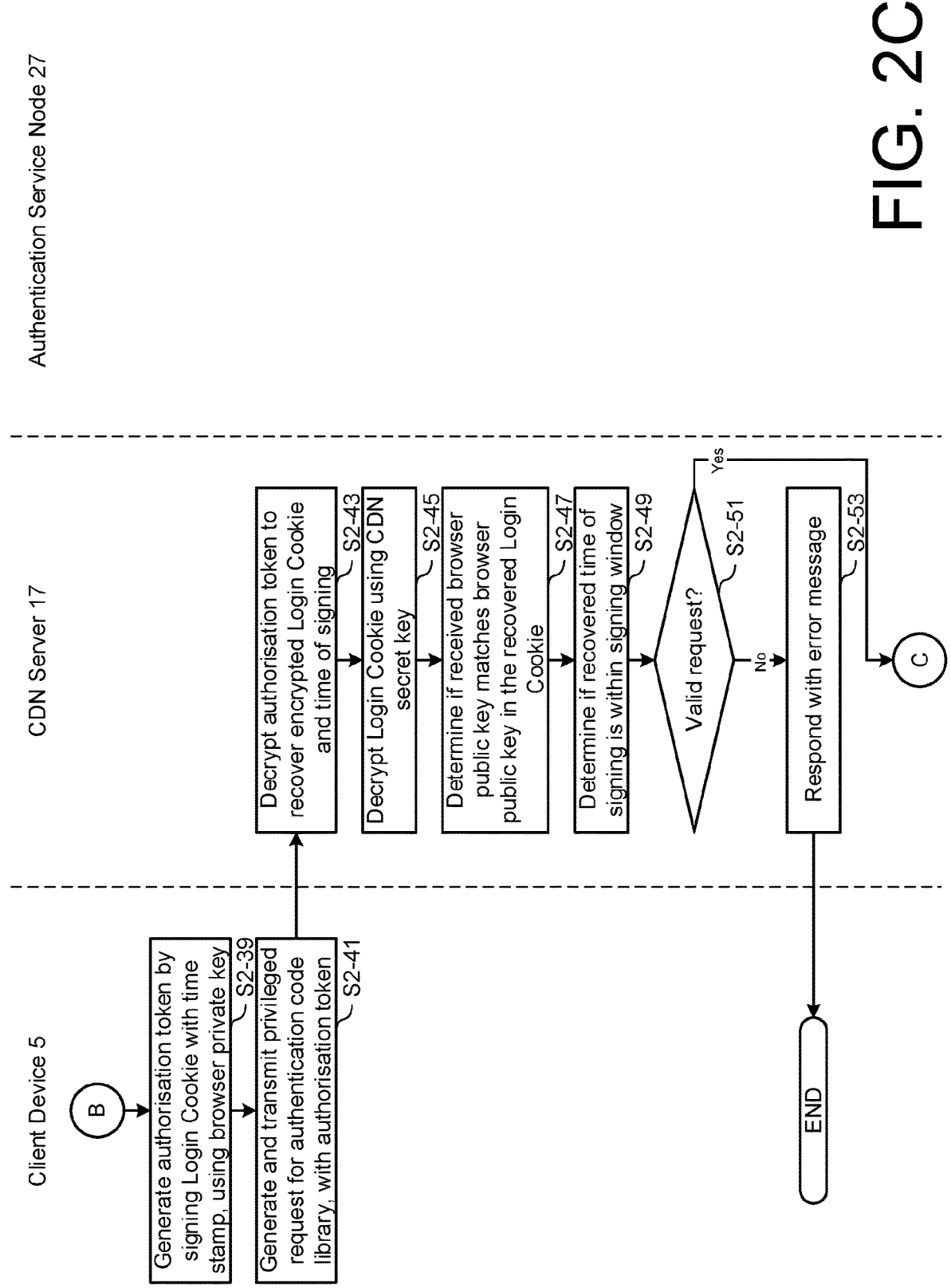
Figure 2D:
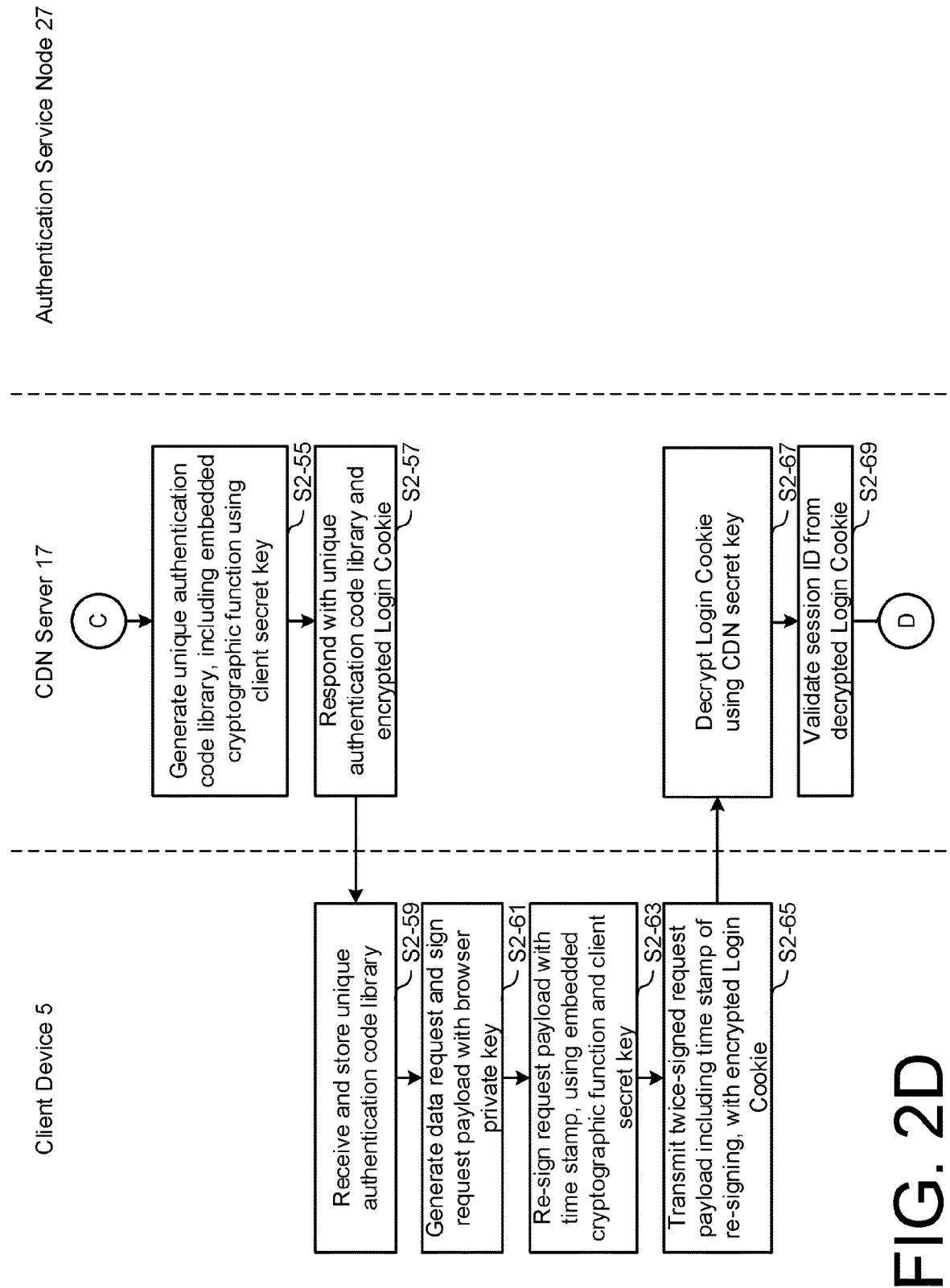
Figure 2E:
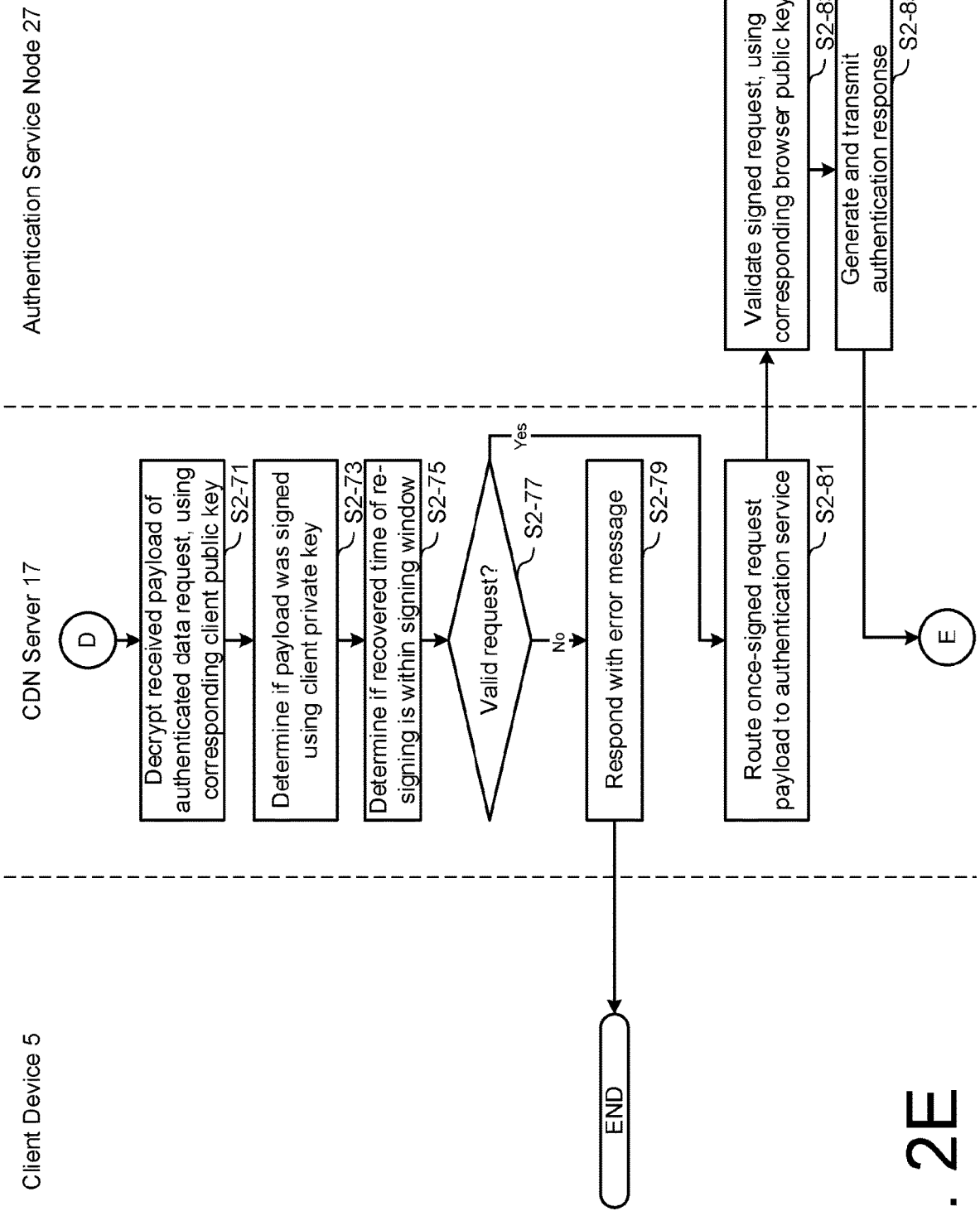
Figure 2F:
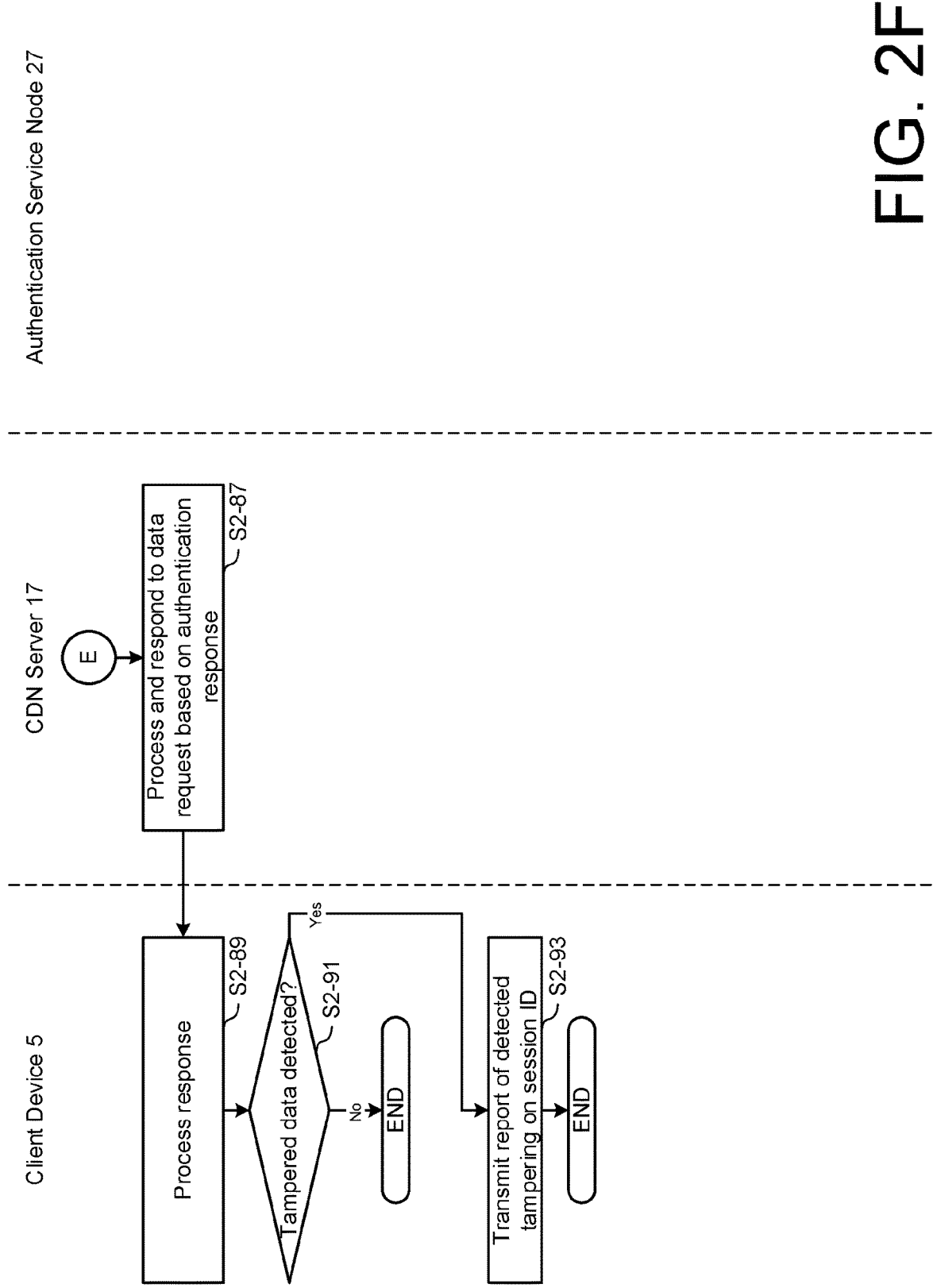

Referring to FIG. 1, a media delivery system 1 according to an embodiment includes a content server 3 for delivering software applications to client devices 5 via a Content Distribution Network (CDN) 7. The content server 3 may be a media content data centre or media delivery server farm. In this exemplary embodiment, the content server 3 includes a web server 9 to host web pages of a media distribution website or Internet-based service. The web pages typically include Internet application code files 11 to provide an interactive media application that allows users to browse the website or service to search and navigate a database of media content 15, select and request media content 15, receive and play media content 15, etc. The Internet application code files 11 may implement API calls between servers 3,17 and devices 5 to request executable functions.

The content server 3 may offload delivery of data, including the application code 11 and media content 15, to distributed CDN servers 17 of the CDN 7. Typically, the CDN servers 17 are located at different geographic locations, serving as 'edge' computing nodes of the Internet that minimise the physical distance between any given client device 5 and the CDN 7. Client devices 5 that desire the media content 15 may be directed, for example by a Domain Name Server (DNS), to the closest CDN server 17 to obtain the appropriate application code 11 and media content 15. In this way, latency between the client devices 5 and the CDN 7 and/or the content server 3 is reduced.

Each CDN server 17 includes a communication module 19 for receiving and processing requests from the content server 3 and the client devices 5, and communicating responses therebetween via the CDN 7. The communication module 19 processes requests using a cryptography module 20 of the CDN server 17, for example to encrypt/decrypt and digitally sign data using asymmetric encryption techniques. The communication module 19 also uses a cache manager module 21 of the CDN server 17, for example to store and deliver data from cache memory 23 to further improve delivery efficiency. The cryptography module 20 may implement a cryptography API, for example to a cryptography service node (not shown). The CDN 7 may include a plurality of data networks, including the Internet. Each CDN server 17 may also include application programming interfaces (APIs) to other services of the CDN 7. In this exemplary embodiment, an authentication API 25 is provided for the CDN server 17 to communicate with an authentication service node 27 that performs web authentication operations. An obfuscation API 29 is also provided for the CDN server 17 to communicate with an obfuscation service node 31 that obfuscates application code 11 from the web server 9 before delivery to the client devices 5. Alternatively or additionally, one or more of the CDN servers 17 and/or the content server 3 may be configured to provide the functionality of the authentication service node 27 and/or the obfuscation service node 31. A CDN command node (not shown) may also be provided to manage and coordinate the operations of the CDN servers 17 in the CDN 7.

In the present embodiment, the application code 11 is configured to implement one or more security protocols of the system 1, using one of a plurality of authentication code libraries 33. Each authentication code library 33 may be unique and includes computer-executable instructions for digitally signing data using a respective embedded cryptography key. In particular, Internet application code files 11 executed by a client device 5 may use a respective one of the authentication code libraries 33 to secure and protect API calls to the servers 3,17. Preferably, the authentication code libraries 33 implement browser-supported encryption algorithms, using a web browser cryptography API called from within the secure authentication code libraries. Example encryption algorithms include symmetric encryption such as AES 128-bit or 256-bit, and asymmetric key techniques such as RSA, Diffie-Hellman, elliptic curve, etc. Advantageously, this provides a good degree of confidence that a secure token has not been subjected to malicious or fraudulent activity, such as one that has been lifted and reused from another browser in combination with a secondary key embedded in the authentication code library.

The CDN server 17 may respond to requests from application code 11 running on a client device 5 by delivering an assigned unique authentication code library 33', for execution by the client device 5 to digitally sign a subsequent request for data. A set of authentication code libraries 33 may be generated by the obfuscation service node 31 for a corresponding plurality of unique keys. Each authentication code library 33 may be uniquely obfuscated according to a defined algorithm known only to the CDN servers 17 and the client devices 5. For example, the obfuscation service node 31 may be configured to obfuscate one or more elements or components such as functions and/or interfaces of an authentication code library 33. Alternatively or additionally, the obfuscation service node 31 may implement edge level dynamic web content assembly, for example using Edge Side Includes, to dynamically combine one or more obfuscated elements to form a unique authentication code library 33'.

Individual unique authentication code libraries 33 may be dynamically generated and obfuscated responsive to a request from a client device 5. Alternatively, a defined number of unique authentication code libraries 33 may be periodically generated, for example by a master CDN server, as a batch of time-limited code library files that are pushed to the cache memory 23. Advantageously, this modification provides for high scalability as the total number of supported users increases, by offloading generation of the files as cached by the CDN servers 17, instead of on-demand generation of these files per user on the individual servers. The authentication code libraries 33 within each periodically generated set may each implement a different, unique, cryptography key.

The CDN server 17 may maintain including data identifying the unique authentication code libraries 33 mapped to respective assigned client devices 5, for example in a backend database, or as structured data in one or more data files. Advantageously, there is no need to store or manage any token validity state information in such a backend database, as the encrypted cookies (secure tokens) of the embodiments control time-based validity.

The client devices 5 may be any electronic devices, such as a mobile/cellular 'smart' telephone, desktop computer, laptop computer, notepad/tablet computer, personal digital assistant (PDA), or the like. The client device 5 may have software that runs a web browser 13 to request, receive and display web pages hosted by the web server 9. The web browser 13 may execute received application code 11 to provide an interface of the interactive media application for a user to browse, request and retrieve media content 15 from the content server 3 via the CDN 7.

A brief description has been given above of the components forming part of the media delivery system 1 of this embodiment. A more detailed description of the operation of these components will now be given with reference to the flow diagrams of FIG. 2, for a computer-implemented method of distributing content using the CDN 7, according to another embodiment. As shown in FIG. 2, the process begins at step S2-1 where the client device 5 may transmit a request for a media distribution website hosted by the content server 3. The request may be for example, a HyperText Transfer Protocol (HTTP) or HyperText Transfer Protocol Secure (HTTPS) request, from the web browser 13 on the client device 5. In this embodiment, an initial request may be for a login web page of the website, including application code 11 for the client device 5 to establish browser-level authentication and secured communication protocols with the CDN 7. The application code 11 may include a plurality of code files, such as a digital file in a mark-up language (e.g. HTML5), JavaScript, Cascading Style Sheets (CSS), PHP, Python, and the like. Preferably but not essentially, the application code 11 may be statically obfuscated, for example at build time, as a masked version of the original code which is functionally equivalent. The web page data may also include media files, such as images, video, audio and the like.

At step S2-3, the communication module 19 of one of the CDN servers 17, for example the closest CDN server 17 to the client device 5 as determined by a DNS server, receives the initial request and checks the CDN cache memory 23 for the requested login web page data. References to the CDN server 17 in the following description refer to this determined CDN server, although it will be appreciated that a plurality of servers 17 of the CDN 7 may be involved to handle the complete process of login, authentication and content delivery. If the cache manager module 21 of the CDN server 17 determines that the requested web page and login data are not stored in its cache memory 23, then at step S2-5, the communications module 19 requests and receives the web page and login data from the content server 3. At step S2-7, the cache manager module 21 caches the requested data at the CDN level, by storing a copy of the requested data in the cache memory 23 of the CDN server 17. On the other hand, if the cache manager module 21 determines at step S2-3 that the requested web page and login data are cached at the CDN level, then at step S2-11, the cache manager module 21 retrieves the requested data from cache memory 23. At step S2-13, the communication module 19 of the CDN server 17 responds to the request, by transmitting the requested login web page data to the client device 5.

The web browser 13 of the client device 5 receives and executes the application code 11, for example to generate and display the login web page including input fields for the user to create or enter credentials of the user's account with the content provider. At step S2-15, the client device 15 creates a new browser public/private key pair. For example, the web browser 13 may execute a call to a web browser cryptography API. At step S2-17, the client device 5 generates and transmits a login request token to the CDN server 17, for example in response to the user entering and submitting login credentials. The web browser 13 may generate a login request token by signing the login data with the browser private key from step S2-15. The browser public key from step S2-15 may also be added to the login request token. At step S2-19, the CDN server 17 receives and process the login request via the authentication API 25, for example by routing the login request to the authentication service node 27.

The authentication service node 27 may verify the origin of the login request, for example based on a comparison and validation of the corresponding browser public key between the requests, at step S2-21. At step S2-23, the authentication service node 27 generates and transmits a login response, for example based on verification of the user entered account credentials, and validation of the request itself. At step S2-25, the CDN server 17 receives the login response from the authentication service node 27 and determines if the login is valid. If it is determined that the login is not valid, then at step S2-27, the CDN server 17 may respond to the client device 5 with an unsuccessful login message. As part of the login process, the login web page application code 11 may cause the web browser 13 to create a new browser public/private key pair, using the cryptography module 20, either for registering a new account or for associating a new asymmetric key pair credential with an existing account. Accordingly, when it is determined at step S2-25 that the login is valid, then the CDN server 17 proceeds to generate and/or assign a new secret cryptography key to the requesting client device 5, at step S2-29, using the cryptography module 20. The client-specific secret cryptography keys may be generated and pre-assigned to respective client devices 5 registered with the system 1, for example when a particular client device 5 is first registered with the content provider. The client-specific cryptography keys may be symmetric keys, such as AES, or asymmetric keys, such as RSA public/private key pairs.

As generally known in the art, service providers may typically require that an issued authorisation token is included with every privileged request, as a secure way to authenticate a user without having to repeatedly process and verify login credentials. Accordingly, at step S2-31, the CDN server 17 generates a login cookie, commonly used by web servers to identify account and login state information. In this exemplary embodiment, the login cookie includes data identifying the client-specific cryptography key, the browser public key, a session ID, and a time stamp identifying a specific time that the login cookie was generated. At step S2-33, the CDN server 17 uses the cryptography module 20 to encrypt the login cookie, using a secret encryption key known only to the CDN. The encrypted login cookie may also be referred to as a secure token. At step S2-35, the CDN server 17 responds to the login request with a successful login message and the encrypted login cookie. The web browser 13 of the client device 5 receives and stores the encrypted login cookie at step S2-37.

Following successful login, the client device 5 is configured to make a privileged request to the CDN 7 for an authentication code library 33. In the present exemplary embodiment, the application code 11 is configured to cause the web browser 13 to use the cryptography module 20 to generate an authorisation token at step S2-39, by signing the encrypted login cookie using the browser private key created at step S2-15. The authorisation token includes data identifying the time of signing. The browser public key may also be included in the authorisation token to enable subsequent verification that subsequent requests originate from the same browser. At step S2-41, the client device 5 generates and transmits a privileged request for the authentication code library 33 to the CDN 7, the request including the authorisation token. The privileged request for the authentication code library 33 may be implemented in the application code 11 of the login web page or a successful login web page, in order to complete the login process.

The CDN server 17 receives and validates the privileged request. At step S2-43, the CDN server 17 uses the cryptography module 20 to decrypt the received authorisation token to recover the encrypted login cookie and the time of signing, using the corresponding browser public key of the client device 5 as created at step S2-15. At step S2-45, the CDN server 17 uses the cryptography module 20 to decrypt the received encrypted login cookie, using the secret encryption key known only to the CDN. At step S2-47, the CDN server 17 determines if the browser public key as received with the privileged request matches the browser public key in the recovered data elements of the decrypted login cookie. At step S2-49, the CDN server 17 determines if the time of signing, as recovered in step S2-43, is within a predefined signing validity window. For example, the CDN 7 may be configured to determine that an authorisation token is valid if signed within the last x minutes from receipt of the request at the CDN server 17. Alternatively, the signing validity window may be defined relative to the time of creation of the login cookie. If the received and recovered browser public keys do not match and/or the time of signing is not within the predefined signing validity window, then at step S2-51, the CDN server 17 determines that the privileged request is not valid and responds with an error message at step S2-53.

On the other hand, the CDN server 17 determines at step S2-51 that the privileged request is valid when the received browser public key matches the recovered browser public key, and the time of signing is within the predefined signing validity window. In this exemplary embodiment, processing then continues to step S2-55, where the CDN server 17 generates a unique authentication code library 33' using the assigned client-specific cryptography key. The unique authentication code library 33' includes a cryptographic function that can be called to digitally sign input data using the corresponding client-specific cryptography key, which is embedded within the cryptographic function. Preferably, the unique authentication code library 33' is obfuscated by the CDN server 17, for example using the obfuscation API 29. Each one of the plurality of authentication code libraries 33 may be obfuscated using a different one or more processes and/or obfuscation parameters. In this way, a unique executable component of the software application can be dynamically generated and obfuscated for a specific client device 5 responsive to an on-demand request. The CDN server 17 responds to the privileged request with the unique authentication code library 33' together with the encrypted login cookie at step S2-57.

Alternatively, or additionally, an obfuscation service node 31 may be configured to generate a predefined number of unique obfuscated authentication code libraries 33 at regular intervals, e.g. x minutes or hours corresponding to the predefined signing validity window, which can be pushed to the CDN servers 17 and stored in cache memory, for example. The CDN server 17 may then randomly determine and assign one of the stored unique libraries to the requesting device 5 or user. Advantageously, this alternative implementation provides a further level of security control in the system, as each set of unique libraries is effectively valid for a predefined time window, without requiring processing overhead at the client device to maintain or check the time validity. As a related modification, a master CDN server may be configured to dynamically adapt the number of unique obfuscated authentication code libraries 33 that are generated over a defined period of time. For example, the server may generate a greater or lesser number of files at certain periods of a day, based on historically observed computational load and/or demand and/or to obtain optimal cache offload. Dynamically adjusting the frequency and volume of generated unique obfuscated authentication code libraries 33 in such a pseudo-random way may further improve inherent security and trust in the resulting digital tokens, since it is less likely for the secure tokens to be fraudulently generated.

After receiving and storing the unique authentication code library 33' at step S2-59, the client device 5 is configured to generate authenticated data requests to content server 3 via a CDN server 17. For example, the client device 5 may make an API call to the CDN 7, via one or more Internet application code files 11, to transmit from and/or request data to be output by the interactive media application, such as content listing data, video data chunks at regular intervals, streaming quality parameters, analytics information, etc. Accordingly, at step S2-61, the web browser 13 of the client device 5 executes the application code 11 to generate and digitally sign a data request to the CDN server 17, for example in response to the user selecting media content to be received from the content server 3. In this embodiment, the data request payload is signed a first time, using the browser private key, to secure and enable authentication of the request in accordance with conventional authentication protocols. At step S2-63, the web browser 13 uses the embedded cryptography function of the unique authentication code library 33' stored on the client device 5, to digitally sign the request payload a second time, using the client-specific private key, to enable an additional time-based and scalable authentication control at the CDN-level. The re-signed request payload also includes data identifying the time of re-signing, At step S2-65, the client device 5 transmits the authenticated data request to the CDN 7, including the twice-signed request payload, the time stamp of re-signing, and the encrypted login cookie as received from the CDN server 17. At step S2-67, the CDN server 17 uses the cryptography module 20 to decrypt the received encrypted login cookie, using the secret encryption key known only to the CDN. Preferably, but not essentially, the CDN server 17 may validate the session ID recovered from the decrypted login cookie, at step S2-69. For example, the CDN server 17 may check a CDN blacklist or whitelist to determine if the session ID has been revoked. At step S2-71, the CDN server 17 decrypts the payload of the received authenticated data request, using the corresponding client-specific public key created at step S2-29. At step S2-73, the CDN server 17 determines and verifies that the request payload was signed with the client-specific encryption key. At step S2-75, the CDN server 17 determines if the time of re-signing recovered from the decrypted request payload, is within the predefined signing validity window. If the request payload was not signed by the client-specific encryption key and/or the time of re-signing is not within the predefined signing validity window, then at step S2-77, the CDN server 17 determines that the alleged authenticated data request is not valid and responds with an error message at step S2-79.

On the other hand, when it is determined at step S2-77 that the authenticated data request is valid at the CDN-level, then the CDN server 17 proceeds to validate the once-signed request payload, having been 'unwrapped' at step S2-71. For example, the CDN server 17 may route the once-signed request payload to an authentication service node 27 at step S2-81, using the authentication API 25. The authentication service node 27 may validate that the signed request payload is received from the expected browser, by confirming that the browser public key in the decrypted secure token matches the corresponding browser public key from step S2-83. At step S2-85, the authentication service node 27 may generate and transmit an authentication response back to the CDN server 17. At step S2-87, the CDN server 17 may process and respond to the authenticated data request based on the authentication response. For example, on-demand streaming delivery of identified media content from CDN cache 23 and/or content server 3 may be initiated in response to a valid authentication response.

The client device 5 may receive and process the response data at step S2-89, to determine data associated with the authentication response. At step S2-91, the client device 5 may be configured to detect, from the data associated with the authentication response, whether any of the data files as transmitted between the client device 5 and the CDN server 17 have been tampered with. For example, the CDN server 17 may inject a digital watermark to the data files for tamper detection. If tampered data is detected, then at step S2-93, the client device 5 may generate and transmit report data identifying detected tampering on the current session ID to the CDN 7. The report data may cause an update to a CDN blacklist or whitelist based on the compromised session.

Example Computer System Implementation

Figure 3:
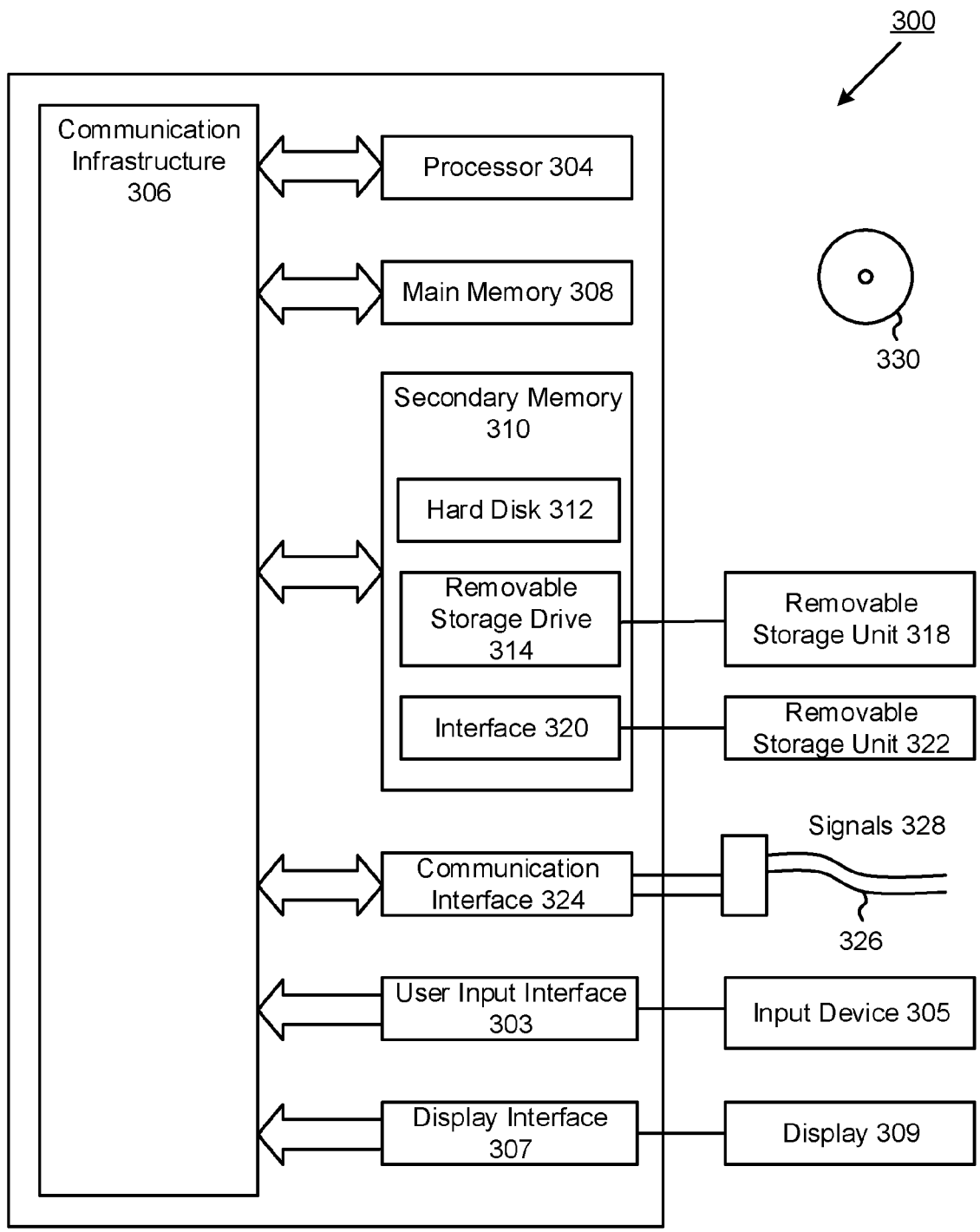
FIG. 3 is a diagram of an example of a computer system on which one or more of the functions of the embodiment may be implemented.

FIG. 3 illustrates an example computer system 300 in which the present invention, or portions thereof, can be implemented as computer-readable code to program processing components of the computer system 300. For example, the content server 3, CDN servers 17, and client devices 5 of FIG. 1 can each be implemented by a respective one more of system 300. The methods illustrated by the processing components in the flowchart of FIG. 2 can also be implemented in respective systems 300. Various embodiments of the invention are described in terms of this example computer system 300. After reading this description, it will become apparent to a person skilled in the relevant art how to implement the invention using other computer systems and/or computer architectures.

Computer system 300 includes one or more processors, such as processor 304. Processor 304 can be a special purpose or a general-purpose processor. Processor 304 is connected to a communication infrastructure 306 (for example, a bus, or network). Computer system 300 may also include a user input interface 303 connected to one or more input device(s) 305 and a display interface 307 connected to one or more display(s) 309, which may be integrated input and display components. Input devices 305 may include, for example, a pointing device such as a mouse or touchpad, a keyboard, a touchscreen such as a resistive or capacitive touchscreen, etc. According to an embodiment, computer display 330, in conjunction with display interface 302, can be used to display the UI of the web browser 13 on client device 5.

Computer system 300 also includes a main memory 308, preferably random access memory (RAM), and may also include a secondary memory 310. Secondary memory 310 may include, for example, a hard disk drive 312, a removable storage drive 314, flash memory, a memory stick, and/or any similar non-volatile storage mechanism. Removable storage drive 314 may comprise a floppy disk drive, a magnetic tape drive, an optical disk drive, a flash memory, or the like. The removable storage drive 314 reads from and/or writes to a removable storage unit 318 in a well-known manner. Removable storage unit 318 may comprise a floppy disk, magnetic tape, optical disk, etc. which is read by and written to by removable storage drive 314. As will be appreciated by persons skilled in the relevant art(s), removable storage unit 318 includes a non-transitory computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 300, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 318, removable storage unit 322, and a hard disk installed in hard disk drive 312. Computer program medium, computer readable storage medium, and computer usable medium can also refer to memories, such as main memory 308 and secondary memory 310, which can be memory semiconductors (e.g. DRAMs, etc.). These computer program products are means for providing software to computer system 300.

Computer programs to implement the embodiments are stored in main memory 308 and/or secondary memory 310. Computer programs may also be received via communications interface 324. Such computer programs, when executed, enable computer system 300 to implement the present invention as described herein. In particular, the computer programs, when executed, enable processor 304 to implement the processes of the present invention, such as the steps in the methods illustrated by flowchart of FIG. 2 and component architectures of FIG. 1 described above. Accordingly, such computer programs represent controllers of the computer system 300. Where the invention is implemented using software, the software may be stored in a computer program product and loaded into computer system 300 using removable storage drive 314, interface 320, hard drive 312, or communications interface 324.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternative Embodiments

It will be understood that embodiments of the present invention are described herein by way of example only, and that various changes and modifications may be made without departing from the scope of the invention.

For example, in the embodiments described above, the CDN 7 responds to ad-hoc, on-demand requests for the unique authentication code libraries. As those skilled in the art will appreciate, in an alternative embodiment, a client device may be configured to 'call home' to the content provider with 'heartbeat' calls at regular intervals, for example every 10 minutes, to confirm the device is still using the service. In such an implementation, it is further advantageous to configure the CDN to verify that both the authenticated data request(s) and the heartbeat calls originated from the same device and/or web browser. Accordingly, as another modification, the unique authentication code library may be further configured to make the heartbeat calls back to the CDN. For example, as authentication and media streaming processes share the same HTTP stack, a counter may be implemented in the encrypted cookie (or token) to control the number of stream chunks that the CDN is allowed to transmit to the web browser between heartbeat calls. Every time the CDN transmit a stream chunk to the client device, the CDN may increment or decrement the counter in the encrypted cookie, until the client device is forced to use the unique authentication code library to call home again to reset the counter. If the counter is not reset, then the user and/or session ID may be blocked by the CDN. The heartbeat calls back to the CDN may also include metadata identifying detected or potential tampering in relation to the current session ID. For example, the web browser of the client device may detect actual or potential tampering based on detection of an attached or open debugger or other form of developer tools.

As another possible modification, the content server may be configured to include data identifying a risk rating to content and/or stream chunks transmitted to client devices via the CDN. The CDN could then be configured to terminate transmission of content and/or stream chunks to a user and/or client device, for example based on a comparison against an associated risk profile or score. As a further benefit, this alternative implementation would enable the detection and verification that transmitted data streams have not been subject to fraudulent or malicious tampering, even in situations where conventional digital rights management (DRM) controls are disabled.

As yet another alternative, the processing modules of the CDN server and the service nodes of the CDN, may be provided as one or more distributed computing modules or processing services on a remote server that is in communication with the CDN via a data network. Additionally, as those skilled in the art will appreciate, the API module functionalities may be provided as one or more embedded software and/or hardware components of the CDN server, such as a plug-in module, extension, embedded code, etc., configured to communicate with processing modules of the CDN server.

Reference in this specification to "one embodiment" are not necessarily all referring to the same embodiment, nor are separate or alternative embodiments mutually exclusive of other embodiments. In particular, it will be appreciated that aspects of the above described embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A method of delivering content to at least one of a plurality of client devices wherein each client device is provided with an application to request content, the method comprising, at an edge node of a content delivery network (CDN):
   receiving, from a master server of the CDN at defined intervals, a plurality of verification library functions each having a respective embedded cryptographic key to digitally sign content requests;
   storing the received plurality of verification library functions in a memory of the CDN edge node, wherein the embedded cryptographic keys are valid until the respective stored verification library functions are replaced by a subsequent received plurality of verification library functions;
   providing, to at least one of the plurality of client devices, a respective one of the stored plurality of verification library functions;
   receiving a content request from the at least one of the client devices, wherein the content request is digitally signed using the provided verification library function;
   verifying, from the received content request, that the client device possesses the verification library function and a respective valid embedded cryptographic key; and
   delivering the requested content to the client device.

2. The method of claim 1, wherein the received content request comprises data identifying a time of digital signing by the provided verification library function.

3. The method of claim 2, wherein verifying the received request comprises decrypting the signed request, recovering the time of signing, and verifying that the time of signing is within a defined validity period.

4. The method of claim 1, further comprising providing an authentication token to the requesting client device, wherein the authentication token is included in the received content request.

5. The method of claim 4, further comprising cryptographically verifying the authentication token in the received content request based on a secret key.

6. The method of claim 4, wherein the authentication token includes data identifying a session ID, the method further comprising validating the session ID of the received content request against a list of blocked session IDs.

7. The method of claim 6, further comprising causing an update to the list of blocked session IDs in response to detected data tampering on a session ID.

8. The method of claim 1, further comprising obfuscating the verification library function to be provided to the client device, wherein the verification library function includes obfuscated code that is unique to the client device.

9. The method of claim 8, wherein the application further includes at least one portion of obfuscated code.

10. The method of claim 1, further comprising assigning a stored verification library function to a requesting client device.

11. An edge node of a content delivery network (CDN), the edge node comprising;
   a memory; and
   one or more processors arranged to:
      receive, from a master server of the CDN at defined intervals, a plurality of verification library functions each having a respective embedded cryptographic key to digitally sign content requests;
      store the received plurality of verification library functions in the memory of the CDN edge node, wherein the embedded cryptographic keys are valid until the respective stored verification library functions are replaced by a subsequent received plurality of verification library functions;
      provide, to at least one of the plurality of client devices, a respective one of the stored plurality of verification library functions;
      receive a content request from the at least one of the client devices, wherein the content request is digitally signed using the provided verification library function;
      verify, from the received content request, that the client device possesses the verification library function and a respective valid embedded cryptographic key; and
      deliver the requested content to the client device.

12. A non-transitory storage medium comprising machine readable instructions stored thereon for causing an edge node of a content delivery network (CDN) to:
   receive, from a master server of the CDN at defined intervals, a plurality of verification library functions each having a respective embedded cryptographic key to digitally sign content requests;
   store the received plurality of verification library functions in a memory of the CDN edge node, wherein the embedded cryptographic keys are valid until the respective stored verification library functions are replaced by a subsequent received plurality of verification library functions;
   provide, to at least one of the plurality of client devices, a respective one of the stored plurality of verification library functions;
   receive a content request from the at least one of the client devices, wherein the content request is digitally signed using the provided verification library function;
   verify, from the received content request, that the client device possesses the verification library function and a respective valid embedded cryptographic key; and
   deliver the requested content to the client device.

* * * * *